United States Patent [19]
Holm et al.

[11] 3,789,269
[45] Jan. 29, 1974

[54] OVERVOLTAGE PROTECTION CIRCUIT

[75] Inventors: John A. Holm, Dearborn; David A. Lapinski, Detroit, both of Mich.

[73] Assignee: Ford Motor Company, Dearborn, Mich.

[22] Filed: Apr. 13, 1970

[21] Appl. No.: 27,560

[52] U.S. Cl.................. 317/23, 317/31, 317/33 VR
[51] Int. Cl. ............................................ H02h 3/20
[58] Field of Search.................... 317/31, 23, 33 VR

[56] References Cited
UNITED STATES PATENTS
3,529,211   9/1970   Brayley................................. 317/31
3,350,627   10/1967   Wright................................. 317/31 X

*Primary Examiner*—James D. Trammell

[57] ABSTRACT

An electrical circuit means for protecting an electrical system from excessive voltage generated by an electrical energy generator that is particularly suited for use in an automotive vehicle. A regulator is connected to the output windings of an electrical energy generator and to the control winding for limiting the energization of the control winding and the magnitude of the voltage produced in the output windings. A solid state switching network is coupled to the output windings of the generator and the regulator for decoupling the output windings from the regulator when the voltage produced in the output windings exceeds a first predetermined level and for maintaining the output windings decoupled from the regulator until the voltage produced in the output windings falls to a second substantially lower predetermined level.

10 Claims, 1 Drawing Figure

PATENTED JAN 29 1974
3,789,269
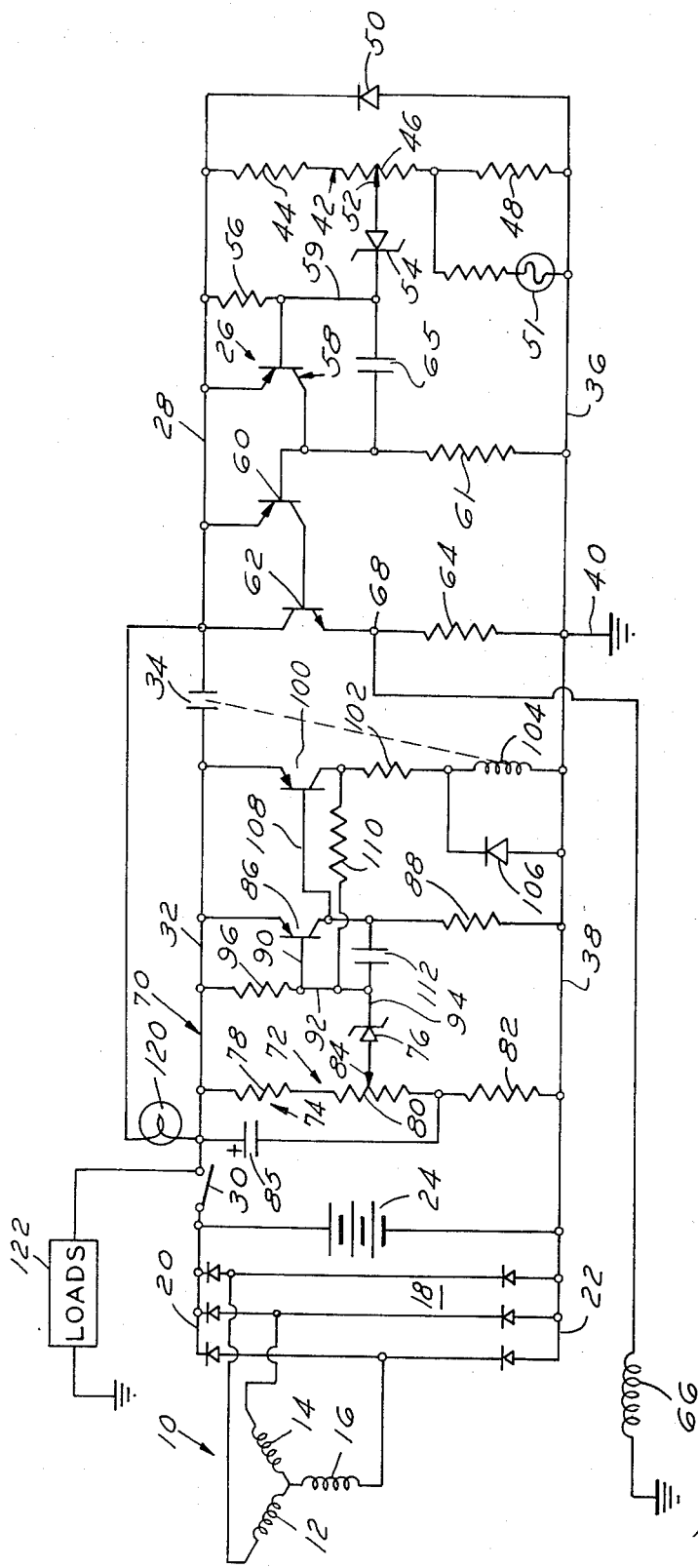
INVENTORS
JOHN A. HOLM
DAVID A. LAPINSKI
BY
John R. Faulkner
Keith L. Zerschling
ATTORNEYS

OVERVOLTAGE PROTECTION CIRCUIT

BACKGROUND OF THE INVENTION

This invention relates generally to the field of electrical generating systems for supplying electrical energy to loads and other electrical devices particularly in automotive vehicles.

More particularly, the invention relates to a means for disconnecting or decoupling a voltage limiter or regulator and the control winding of an electrical generator from the output windings thereof and from an electrical storage battery connected across the output windings when excessive voltages are generated by the generator. If for some reason, there is a failure in the voltage limiter or regulator connected between the output windings of the electrical generator and the control or field winding of the generator that controls the output voltage of these windings, the output voltage may rise to very high levels. It may rise to a level sufficiently high to damage the electrical components of the system and the electrical components of the loads, for example, headlamps, radio equipment, etc., connected to the output windings of the generator.

The purpose of the present invention is to prevent the generation of such excessively high voltages by decoupling the control or field winding and the voltage limiter or regulator, which controls such energization, from the output windings of the generator and from the electrical storage battery connected to these output windings, when the output voltage exceeds a predetermined level. Additionally, it is a purpose of the invention to maintain the control or field winding and the voltage limiter or regulator decoupled from these output windings as long as the output voltage is above a second substantially lower predetermined voltage level, for example, approximately half the terminal voltage of the electrical storage battery.

SUMMARY OF THE INVENTION

In the present invention, there is provided an electrical generator, for example, an alternator connected to a rectifier for producing a D.C. voltage which is supplied to an electrical storage battery and to other electrical loads. In this type of an arrangement, a voltage limiter or regulator is connected to the output terminals of the rectifier and the electrical storage battery. This voltage regulator is, in turn, coupled to the control or field winding of the alternator and limits the output voltage of the alternator to some predetermined level above the terminal voltage of the electrical storage battery. For example, if the electrical storage battery has a terminal voltage of 12 volts, this level or limit may be set at approximately 14 volts.

If for some reason, the voltage regulator should fail to limit the energization of the control or field winding, the output voltage of the alternator appearing at the output terminals of the rectifier may rise to excessively high levels, and consequently, may damage the components of the alternator and rectifier as well as other components in the voltage regulator. In addition, such excessively high voltages may cause extensive damage to the electrical loads connected to the electrical generating system. These loads, in an automotive vehicle, including ground vehicles and aircraft, include lighting equipment and radio equipment. Particularly in aircraft, the radio equipment connected to the electrical generating system is very expensive and is easily damaged by such excessively high voltages. It is important therefore to prevent such excessively high voltages from being generated in order to prevent the damage to these electrical systems.

In the present invention, means are provided for decoupling the voltage limiter or regulator and hence, the field or control winding of the generator from the output terminals of the rectifier and the electrical storage battery when a certain predetermined level of voltage appears in the output windings and across the rectifier terminals. This predetermined level may be set a few volts above the voltage level at which the regulator regulates or limits the voltage output of the generator system.

In the present invention, the means for decoupling the voltage regulator and the field winding from the output windings of the alternator and the terminals of the rectifier and electrical storage battery comprises a solid state switching network that is coupled to control the energization of the winding of a relay. The contacts of the relay are positioned in circuit with the rectifier terminals and the voltage limiter or regulator, and hence, the control or field winding for the electrical generator. A voltage sensing means is connected across the output windings of the generator or alternator to sense excessively high voltages that may be generated by these windings.

When the system is first energized, the relay coil will be energized by the solid state switching network, thus closing the relay contacts and coupling the voltage regulator or limiter and the field or control winding to the electrical storage battery and the output windings of the electrical generator. The voltage regulator or limiter will thus control or limit the output voltage of the electrical generator to some predetermined level. Should a short or other malfunction occur in the voltage limiter or regulator that would directly connect the field winding to the output windings of the electrical generator and thus cause it to operate in an uncontrolled regenerative mode, the voltage sensing means will sense this rise in voltage.

At some predetermined voltage level, the solid state switching network will de-energize the relay winding and thus open the relay contacts thereby decoupling the voltage limiter or regulator and the field winding from the output windings. This solid state switching network includes means for maintaining the relay winding de-energized and hence, the relay contacts open as long as the voltage appearing at the terminals of the output windings and at the terminals of the electrical storage battery is above a certain predetermined lower level. This level may be set at a value below the terminal voltage of the electrical storage battery, for example, one-half such terminal voltage.

As a result of the above described operation, the field or control winding of the generator will cease to be energized and the output windings of the alternator will produce a low output voltage when the system senses a certain predetermined voltage generated by the output windings of the generator. This predetermined voltage level is below that which will damage the electrical components of the system and the loads connected to it.

BRIEF DESCRIPTION OF THE DRAWINGS

The single FIGURE of the drawing discloses an electrical circuit diagram of the present invention.

DESCRIPTION OF THE PREFERRED EMBODIMENT

Referring now to the drawing, there is shown an electrical generator 10 that may be in the form of a Wye connected alternator having output windings 12, 14 and 16 connected to a full wave solid state rectifier 18. This rectifier rectifies the alternating voltage appearing across the windings 12, 14 and 16 to a direct current voltage appearing across the terminals 20 and 22. An electrical storage battery 24 is connected across the output windings of the alternator and rectifier 18, and the rectifier 18 and electrical storage battery 24 are connected to a solid state voltage regulator or limiter 26. The terminal 20 of rectifier 18 is connected to line 28 of the voltage regulator or limiter 26 through a manually operated switch 30, line 32 and relay contacts 34. The other terminal 22 of the rectifier 18 is connected to line 36 of the voltage regulator or limiter 26 through a line 38. The output terminal 22 of the rectifier 18, the line 38 and the line 36 are connected to ground through a lead 40.

The voltage regulator or limiter 26 may be of the solid state switching type and it includes a voltage divider network 42 comprised of resistors 44, 46 and 48 connected across the lines 28 and 36. This voltage divider network also has a diode 50 connected across it and to the lines 28 and 36. In addition, a temperature compensation device in the form of a thermistor 51 is connected across resistor 48. A fraction or portion of the output voltage of the alternator appearing across the lines 28 and 36, when switch 30 is closed and the relay contacts 34 are closed, is sensed by the arm 52 and this voltage is applied to one side of zener diode 54. The other side of zener diode 54 is connected to the line 28 through a resistor 56 and to the base of a first transistor 58 through a lead 59.

The output circuit of transistor 58 is connected to the base circuit of another transistor 60 by a lead between the collector of transistor 58 and the base of transistor 60. A patch for the base current from transistor 60 and the collector current from transistor 58 is provided through resistor 61 to ground or line 36, and the output circuit of transistor 60 is connected to the base of another transistor 62. The transistor 62 is the output transistor for the voltage regulator or limiter 26 and its output circuit is connected in series with a resistor 64. The control or field winding 66 of the alternator or generator is grounded at one end and is connected at a junction 68 intermediate the output circuit of transistor 62 and the resistor 64. Thus, the voltage appearing across the resistor 64 also appears across the control or field winding 66 of the generator or alternator 10.

The voltage regulator or limiter 26 is standard in its operation and when the system is first energized, the terminal voltage of the battery will appear at the emitter of transistor 60 thereby switching it into a conducting state. Switching of transistor 60 to a conducting state will switch transistor 62 to a conducting state thereby sensing current through resistor 64 and fully energizing control or field winding 66. At this time, the zener diode 54 will be in a nonconducting state. As a result, there is no path for current flow from the base of transistor 58 and it will be in a nonconducting state.

The above described state will prevail until the output voltage of the alternator appearing at the rectifier terminals 20 and 22 rises to a certain predetermined level. This level, for example, may be set at approximately 14.5 volts when an electrical storage battery 24 has a nominal terminal voltage of 12 volts. When this voltage level is reached, the zener diode 54 breaks down and conducts sufficiently to switch transistor 58 to a conducting state. This raises the base voltage of transistor 60 sufficiently to switch it to a nonconducting state thereby cutting off current to the base of transistor 62 and switching it to a nonconducting state. Current flow through the control or field winding 66 is reduced thereby decreasing the output voltage of the alternator 10 appearing across the rectifier terminals 20 and 22. This action will then drop the voltage appearing at the arm 52 of the voltage divider 42 and switch transistor 58 to a nonconducting state and transistors 60 and 62 to a conducting state thereby re-energizing the field or control winding 66 and raising the output voltage of the generator or alternator 10. The above described switching action occurs in a cyclic manner and its frequency is controlled by a capacitor 65 connected between the base circuits of transistors 58 and 60. The output voltage of the generator or alternator 10 is thus maintained at a predetermined limited level, for example, as stated previously, 14.5 volts.

The overvoltage protection circuit 70 of the present invention is positioned between the output terminals 20 and 22 of the rectifier 18, the corresponding terminals of the electrical storage battery 24 and the voltage limiter or regulator 26, and it controls the opening and closing of the relay contacts 34. It can be seen from the drawing that when the relay contacts 34 are closed, the voltage regulator or limiter 26 will operate as stated above to control the energization of the control or field winding 66 and hence, the output voltage of the alternator appearing in the windings 12, 14 and 16 and the rectified voltage appearing across the terminals 20 and 22 of the rectifier 18. When the relay contacts 34 are opened, however, the voltage limiter 26 is decoupled or disconnected from the output terminals 20 and 22 of the rectifier 18 and from the terminals of the electrical storage battery 24. As a result, no current can flow into the line 28 and hence, no current can flow into the field or control winding 66 of the generator or alternator 10. When this occurs, of course, the output voltage of the alternator 10 appearing in the windings 12, 14 and 16 and the rectified D.C. output appearing across the terminals 20 and 22 of the rectifier 18 falls to a low level.

The overvoltage protection circuit 70 is comprised of a voltage sensing means 72 which includes a voltage divider network 74 and a zener diode 76. The voltage divider network 74 includes series connected resistors 78, 80 and 82 connected across the lines 32 and 38 with an arm or wiper 84 connected to one terminal of the zener diode 76. A capacitor 85 may be connected across certain portions of the voltage divider network 74 to filter out any A.C. components that might otherwise appear at the arm or wiper 84.

The overvoltage protection circuit also includes a first transistor 86 having its emitter connected to line 32 and its collector connected to line 38 through a resistor 88. The base of transistor 86 is connected to the other terminal of the zener diode 76 through lead 90, lead 92 and lead 94. The lead 90 and hence the base of transistor 86 is also connected to line 32 through a resistor 96. A second transistor 100 has its emitter connected to line 32 and its collector connected to line 38 through a resistor 102 and a winding 104 that controls the relay contacts 34. Diode 106 is connected across the relay winding 104 to suppress transient voltages. The base of transistor 100 is connected through lead 108 to the collector and hence, the output circuit of transistor 86. A network comprised of resistor 96, lead 92, and resistor 110 is connected at one end to the line 32 and at the other end to the junction of the collector of transistor 100 and the resistor 102. A capacitor 112 is connected between the base circuits of transistors 86 and 100 to reduce the sensitivity of the system to A.C. transient voltages.

A warning lamp 120 is connected across the relay contacts 34 by connections to the stationary contact of manually operated switch 30 and to the line 28. Additionally, a load 122 which may take the form of lamps, an ignition system and radio equipment is connected across the electrical storage battery 24 and across the terminals 20 and 22 of the rectifier 18 by connection to the stationary contact of manually operated switch 30.

When the line 32 of the overvoltage protection circuit 70 is initially energized from the electrical storage battery 24 by the closure of the manually operated switch 30, transistor 100 is switched to a conducting state since its emitter is connected to line 32 and its base is connected to line 38 through lead 108 and resistor 88. Switching of transistor 100 to a conducting state energizes the relay winding 104 and closes the relay contacts 34 thereby connecting the voltage regulator or limiter 26 to the output terminals of the electrical storage battery 24 and to the output terminals 20 and 22 of the rectifier 18. At this time, the zener diode 76 will be in a nonconducting state so that current cannot flow out of the base of transistor 86 through the zener diode. Since transistor 100 is in a conducting state, the junction of its collector, resistor 110 and resistor 102 will be at a sufficiently high potential to prevent current flow out of the base of transistor 86 through resistor 110 to this junction. As a result, transistor 86 is in a nonconducting state. At this time, the load 122 is energized from the electrical storage battery 24 and from the terminals 20 and 22 of rectifier 18 and the lamp 120 is not energized since relay contacts 34 are closed.

The above conditions will prevail so long as the output voltage of the generator or alternator 10 appearing at the output terminals 20 and 22 of the rectifier 18 is within normal limits. As stated previously, when using an electrical storage battery 24 that has a nominal terminal voltage of 12 volts, the voltage limiter or regulator 26 may be set to control or limit the output voltage of the generator or alternator 10 to approximately 14.5 volts. The voltage divider network 74 of the overvoltage protection circuit 70 may be set via the adjustment of the arm 84 to cause the zener diode 76 to break down when an excessively high voltage level prevails across the output terminals 20 and 22 of the rectifier 18 and hence, across the lines 32 and 38 of the overvoltage protection circuit 70. This voltage level may be set at approximately 17.5 volts which is higher than the normal regulated voltage, for example, 14.5 volts, but not sufficiently high to damage the components of load 122.

This excessively high voltage may occur, for example, if the transistor 62 in the voltage regulator or limiter 26 fails in a short circuited condition so that it cannot control the current flow into the winding 66 of the generator or alternator 10. Should that happen, the generator or alternator 10 will operate in an unregulated regenerative mode and the voltage appearing in the output windings 12, 14 and 16 and the D.C. rectified voltage appearing across terminals 20 and 22 of the rectifier 18 will rise very rapidly to extremely high levels.

When the voltage reaches this predetermined level, for example, 17.5 volts, the zener diode 76 breaks down thereby permitting current flow out of the base of transistor 86 through the zener diode through the wiper arm 84 and through part of the resistor 80 and the resistor 82 to ground. This switches transistor 86 to a conducting state. Switching of transistor 86 to a conducting state raises the voltage appearing on line 108 and at the base of transistor 100 to a level sufficient to switch transistor 100 to a nonconducting state since base current cannot flow out of the base of transistor 100. This operation de-energizes the relay winding 104 and opens the relay contacts 34. As a result, the voltage limiter or regulator 26 is disconnected from the output terminals 20 and 22 of the rectifier 18 and from the terminals of the electrical storage battery 24. This action also will de-energize the control or field winding 66 since no current can flow through the transistor 62 and into this control or field winding. As a result, the output voltage of the generator or alternator 10 falls rapidly to a very low level.

When the voltage falls below the level set for breakdown of the zener diode 76, this diode will return to its blocking condition and thus prevent current flow out of the base of transistor 86 through it and the path previously described. At this time, however, a base bias is provided on the transistor 86 through the circuit comprised of resistor 96, lead 92, resistor 110, resistor 102 and relay coil 104, and a path for base current is provided through lead 90, lead 92, resistor 110, resistor 104 and relay winding 104. Current flow through this series circuit will be sufficient to provide sufficient base bias on the base of transistor 86 to maintain it in a conducting state and to maintain transistor 100 in a nonconducting state until the voltage appearing across the lines 32 and 38 of the overvoltage protection circuit falls to a second substantially lower predetermined level, which level is determined by the values of resistor 96, resistor 110, the Vbe and the hfe of transistor 86. The current flow through the winding 104 will not be sufficiently high, however, to close relay contacts 24. The values may be so selected that the transistor 86 will be maintained in a conducting state until the voltage appearing across the lines 32 and 38 falls to a level below the nominal terminal voltage of the electrical storage battery 24, for example, to approximately one-half the nominal terminal voltage of the battery 24. Hence, the transistor 86 cannot be switched to a nonconducting state, the transistor 100 cannot be switched to a conducting state, the relay winding 104 cannot be energized and the relay contacts 34 cannot be closed until the battery 24 becomes substantially discharged.

Additionally, when the relay contacts 34 are closed, the warning lamp 120 will not be energized, but when they are opened, current may flow through the warning lamp 120 from the switch 30 and into the line 28. This will warn the vehicle operator that the circuit has a malfunction and that the overvoltage protection circuit 70 has come into operation to protect the electrical loads 122 connected to the generator or alternator 10 and to protect the remaining electrical components in the alternator 10, rectifier 18 and the voltage limiter or regulator 26.

Thus, the above system will prevent damage to the electrical loads which are susceptible to damage when excessively high voltages are generated in the electrical generating system connected to supply electrical energy to these loads.

We claim:

1. In an electrical generating system for an automotive vehicle the combination comprising, an electrical energy generator having output windings and a control winding, a regulator means connected to said output windings and said control winding for limiting the energization of said control winding and the magnitude of the voltage produced in said output windings, an overvoltage protection circuit means for disconnecting said regulator means and said control winding from said output windings when the voltage produced in said output windings exceeds a predetermined level, said overvoltage protection circuit means comprising, means connected to said output windings for sensing the output voltage of said output windings, a normally closed switch means connecting said output windings with said regulator means, and means coupled to said means for sensing the output voltage of said windings and switch means for opening said switch means when the output voltage of said windings exceeds said predetermined level and for closing said switch means when the output voltage of said windings falls to a second predetermined level substantially below said first predetermined level.

2. The combination of claim 1 in which an electrical storage battery is connected to said output windings and in which the first predetermined level is greater than the terminal voltage of said electrical storage battery and said second predetermined level is approximately one-half the terminal voltage of said electrical storage battery.

3. The combination of claim 2 in which said last mentioned means comprises a solid state switching network connected to said output windings and said electrical storage battery and said normally closed switch means comprises a pair of contacts and a winding, said contacts being closed when said winding is energized, said solid state switching network being coupled to said winding for controlling the energization of said winding.

4. The combination of claim 3 in which said solid state switching network comprises a first and a second solid state switching device, means coupling said first and second solid state switching devices for maintaining said second solid state switching device in a conducting state when said first solid state switching device is in a nonconducting state and for maintaining said second solid state switching device in a nonconducting state when said first solid state switching device is in a conducting state, means coupled to said means for sensing the output voltage of said output windings and said first solid state switching device for maintaining said first solid state switching device in a nonconducting state and said second solid state switching device in a conducting state when the voltage produced in said output windings is below said first predetermined level, for switching said first solid state switching device to a conducting state and said second solid state switching device in a nonconducting state when the voltage produced in said output windings exceeds said first predetermined level, for maintaining said solid state switching devices in such last mentioned state as long as the terminal voltage of said battery is above said second substantially lower predetermined level and for switching said solid state switching devices to said first mentioned state when the terminal voltage falls to the value of said second substantially lower predetermined level.

5. In an electrical generating system the combination comprising, an electrical energy generator having output windings and a control winding, a regulator connected to said output windings and said control winding for limiting the energization of said control winding and the magnitude of the voltage produced in said output windings, and means coupled to said output windings and said regulator for decoupling said output windings from said regulator when the voltage produced in said output windings exceeds a first predetermined level, for maintaining said output windings decoupled from said regulator when the voltage produced in said output windings is greater than a second substantially lower predetermined level and for recoupling said output windings to said regulator when the voltage produced in said output windings falls to said second substantially lower predetermined level.

6. The combination of claim 5 in which an electrical storage battery is connected across said output windings and in which said first predetermined level is greater than the terminal voltage of said battery and said second substantially lower predetermined level is less than the terminal voltage of said battery.

7. The combination of claim 6 in which said last mentioned means comprises a relay having contacts and a winding, said contacts being positioned between said output windings and said regulator, and solid state switching means connected across said output windings and in circuit with said relay winding for energizing said winding and closing said contacts when the voltage produced in said output windings is between the terminal voltage of said battery and said first predetermined level, for de-energizing said relay winding and opening said contacts when the voltage produced in said output windings exceeds said first predetermined level, for maintaining said relay winding de-energized and said relay contacts open when the voltage produced in said output windings is above said substantially lower predetermined level and for closing said relay contacts when the voltage produced in said output windings falls to said substantially lower predetermined level.

8. The combination of claim 7 in which said solid state switching means comprises a pair of solid state switching devices, each of said solid state switching devices including a pair of output electrodes and a control electrode, the output electrodes of said first solid state switching device being connected across said output windings, means coupled to the control electrode of said first solid state switching device and to said output windings for maintaining said first solid state switching device in a nonconducting state when the voltage produced in said output windings is below said first predetermined level and for switching said first solid state switching device to a conducting state when the voltage produced in said output windings is equal to or above said first predetermined level, the output electrodes of said second solid state switching device being connected in series circuit with said relay winding, said series circuit being connected across said output windings, means coupling the output electrodes of said first solid state switching device to the control electrode of said second solid state switching device for maintaining said second solid state switching device in a conducting state when the voltage produced in said output windings is below said first predetermined level and for switching said second solid state switching device to nonconducting state when said first solid state switching device is in a conducting state and means coupled to said control electrode of said first solid state switching device for maintaining said first solid state switching device in a conducting state when the voltage produced in said output windings is above said second lower predetermined level and for switching said first solid state switching device to a nonconducting state when the voltage produced in said output windings falls to said second lower predetermined level.

9. The combination of claim 6 in which said last mentioned means comprises a voltage sensing means connected to said output windings and a solid state switching network coupled to said output windings and said voltage sensing means, a relay having contacts coupled between said output windings and said regulator and a winding connected in circuit with and controlled by said solid state switching network.

10. The combination of claim 9 in which said solid state switching network and said voltage sensing means includes means for energizing said relay winding and thereby closing said contacts upon energization of said solid state switching network from said electrical storage battery and said output windings, said voltage sensing network and said solid state switching network including means for de-energizing said relay winding and opening said contacts when the voltage produced in said output windings exceeds said first predetermined level, for maintaining said relay winding de-energized and said contacts open as long as the voltage produced in said output windings is above said second substantially lower predetermined level and for energizing said relay windings and closing said contacts when the voltage produced in said output windings falls to said second substantially lower predetermined level.

* * * * *